Patented Feb. 5, 1929.

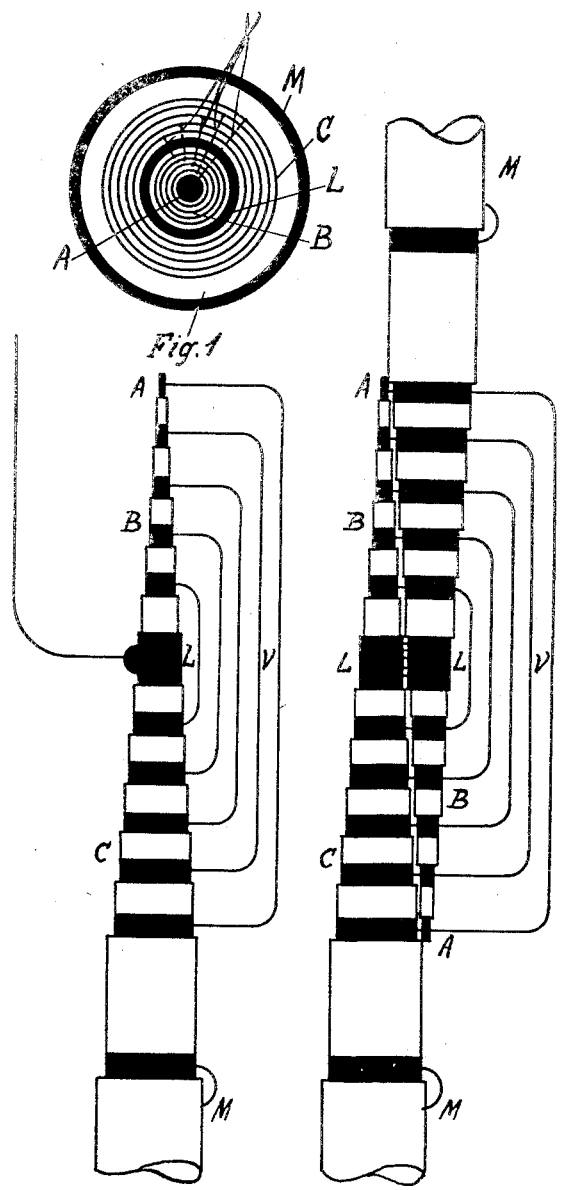

1,701,279

UNITED STATES PATENT OFFICE.

SALMAN SILBERMANN, OF PORZ-ON-THE-RHINE, GERMANY.

END SLEEVE AND JUNCTION BOX FOR HIGH-TENSION CABLES.

Application filed June 25, 1924, Serial No. 722,334, and in Germany June 30, 1923.

In United States patent application Ser. No. 721,931 filed June 23, 1924 and German patent application S. 63,233 VIII/21 c 1 a high tension cable is described constructed on the principle of a condenser. In the aforesaid application there is described a cable having a hollow tubular conductor, the external insulation of which is broken up by metallic layers so as to form partial capacities. These partial capacities are equalized by the addition, in parallel, of capacities constructed within the hollow tubular conductor, said internal capacities being constructed similar to the external capacities. By making all the exterior partial capacities equal by the addition of the partial capacities formed within the hollow conductor, a more even voltage gradient through the insulation is established.

Figure 1 is an end view of my improved cable.

Figure 2 is an end elevation showing a method of preparing the end of the cable for connections.

Figure 3 is a similar view showing a connection of two lengths of my improved cable such as might be used at a junction box.

Like characters of reference indicate like parts in the different views.

Such a cable is shown for example in Figure 1. In this case the conductor L is made tubular and in the hollow space there is an insulation B having embedded conducting sheets. It is important in such a construction of cable, as is set forth specially in the above mentioned application, that connections between the sheets of the main insulation C and the sheets in the insulation in the hollow space B be made at all junction boxes and end sleeves, or terminal connections, so that no detrimental currents causing additional losses will flow in the sheets. Further, it is well known how difficult it is to make good reliable joints and end couplings or terminal connections even for high tension cables of ordinary construction, whilst for complicated cables according to the above mentioned application the difficulties are still greater.

The present invention provides a method of preparing the ends of these and similar cables, for jointing and insertion in junction boxes and for end connections or couplings and for making the necessary connections therein, this method providing a construction which has small dimensions, great simplicity, very easy construction and very great reliability. The methods of preparation are shown in Figs. 2 and 3.

In an end sleeve the cable end is stripped from armouring and casing and the cable insulation is so pared off in steps that at each step a sheet is exposed. The lengths of the steps are so chosen that no flash over can be produced between the particular steps by the part of the normal voltage applied thereon. Since the pressure distribution between the sheets is settled by the cable construction the steps can be so arranged that an almost uniform pressure distribution is obtained along the stripped terminals. With such a structure the cable ends may be made proportionately shorter and the flashover voltage will remain high.

The exposed metallic sheets are, like the sheets in the cable according to the above mentioned patent, electrically connected to each other, as shown in Figures 2 and 3.

In the drawings is shown an end sleeve or terminal connection, Fig. 2, and a junction box connection, Fig. 3, for single core cables. For multicore cables there are a correspondingly greater number of parts. The shaded parts in the drawings indicate the said exposed sheets, further M is the casing (lead or the like) L the tubular main conductor, A the central additional conductor, V the connections between the sheets. In the junction box the two exposed ends lie against one another as shown in Figure 3 since the connections can then be effected in the simplest way. The joint is then placed in a casing, alone or with other cables of the circuit, and the casing filled with oil or other suitable insulating substance.

What I claim is:—

1. A cable consisting of a tubular conductor, having internal and external insulation, and a series of concentric metallic sheets within each body of insulation, with layers of insulation between adjacent sheets, the end of the cable being stripped in stepped form to expose short lengths of the conductor, the metal sheets and the intervening layers of insulation, the metal sheet of largest diameter being electrically connected to the one having the smallest diameter, and the other sheets being connected in pairs, the next largest sheet with the next smallest, and so on.

2. A cable joint consisting of two cable ends constructed as in claim 1 and the metal sheets of one cable end being electrically connected as specified in claim 1, the sheet of smallest diameter of one cable being electrically connected to the sheet of largest diameter of the other, the next smallest of the first cable being connected to the next largest sheet of the other, and so on.

3. A cable joint consisting of two cable ends constructed as in claim 1 and the metal sheets of one cable end being electrically connected as specified in claim 1, the sheet of smallest diameter of one cable being electrically connected to the sheet of largest diameter of the other, the next smallest of the first cable being connected to the largest sheet of the other, and so on, the cable ends lying side by side with the exposed end of the sheet of largest diameter of each cable opposite that of the sheet of the smallest diameter of the other and the intermediate exposed ends in opposite relation.

In testimony whereof I hereunto affix my signature.

SALMAN SILBERMANN.